US009575636B2

(12) United States Patent
Weitzman et al.

(10) Patent No.: US 9,575,636 B2
(45) Date of Patent: Feb. 21, 2017

(54) GRAPHICAL USER INTERFACE FOR TRACKING CONTEXT

(71) Applicant: VMware, Inc., Palo Alto, CA (US)

(72) Inventors: Louis Weitzman, Brookline, MA (US); Brian Partridge, Brookline, MA (US); Alister David Lewis-Bowen, Cambridge, MA (US); Robert Sullivan, Chelmsford, MA (US)

(73) Assignee: VMware, Inc., Palo Alto, CA (US)

( * ) Notice: Subject to any disclaimer, the term of this patent is extended or adjusted under 35 U.S.C. 154(b) by 183 days.

(21) Appl. No.: 13/931,570

(22) Filed: Jun. 28, 2013

(65) Prior Publication Data

US 2015/0007086 A1   Jan. 1, 2015

(51) Int. Cl.
*G06F 3/048* (2013.01)
*G06F 3/0484* (2013.01)
*G06F 3/0488* (2013.01)

(52) U.S. Cl.
CPC .......... *G06F 3/0484* (2013.01); *G06F 3/0488* (2013.01)

(58) Field of Classification Search
CPC .......... G06F 17/30277; G06F 3/04842; G06F 3/1204; G06F 3/1229; G06F 3/1286; G06F 11/32; G06F 17/212; G06F 17/248; G06F 19/3418; G06F 19/363; G06F 3/005; G06F 21/57; G06F 2221/2103; G06F 2221/2107; G06F 19/325; G06F 19/3406; G06F 19/3431; G06F 19/3437; G06F 19/3456; G06F 19/3475; G06F 19/3481; G06F 3/0481; G06F 3/04817; G06F 1/1626
See application file for complete search history.

(56) References Cited

U.S. PATENT DOCUMENTS

| | | | |
|---|---|---|---|
| 2003/0023721 A1* | 1/2003 | Vinberg | G06F 3/0481 709/224 |
| 2003/0177190 A1* | 9/2003 | Moody | G06Q 10/107 709/206 |
| 2006/0041580 A1* | 2/2006 | Ozdemir | G06F 17/30194 |
| 2008/0046581 A1* | 2/2008 | Molina | H04L 63/08 709/229 |
| 2009/0299824 A1* | 12/2009 | Barnes, Jr. | G06F 3/04847 705/7.39 |

(Continued)

OTHER PUBLICATIONS

Dey, Anind K. and Abowd, Gregory D. (College of Computing & GVU Center Georgia Institute of Technology) and Salber, Daniel (IBM T.J. Watson Research Center), "A Conceptual Framework and a Toolkit for Supporting the Rapid Prototyping of Context-Aware Applications", http://www.cc.gatech.edu/fce/ctk/pubs/HCIJ16, 67 pages.

(Continued)

*Primary Examiner* — William Bashore
*Assistant Examiner* — Rayeez Chowdhury (57) ABSTRACT

Embodiments of the present disclosure provide a user interface having a header or banner that displays information about a current context to help a user to gather information. In one example, the user interface displays information of a datacenter's health and status, including alerts that have been triggered. The user interface displays a context banner that tracks information gathered and actions taken within the context of the alert, and provides aggregate information or detailed information about the alert.

18 Claims, 6 Drawing Sheets

(56) References Cited

U.S. PATENT DOCUMENTS

| | | | |
|---|---|---|---|
| 2011/0040824 A1* | 2/2011 | Harm | G06F 9/45529 709/203 |
| 2011/0261055 A1* | 10/2011 | Wong | H04L 41/0609 345/440 |
| 2013/0263126 A1* | 10/2013 | Kulkarni | G06F 9/45533 718/1 |
| 2014/0258446 A1* | 9/2014 | Bursell | G06F 15/177 709/217 |
| 2015/0026108 A1* | 1/2015 | Portegys | G06F 9/5083 706/21 |

OTHER PUBLICATIONS

Fischer, Gerard "Context-Aware Systems—The 'Right' Information, at the 'Right' Time, in the 'Right' Place, in the 'Right' Way, to the 'Right' Person", Center for LifeLong Learning & Design (L3D), Department of Computer Science and Institute of Cognitive Science, University of Colorado, Boulder, USA, http://l3d.cs.colorado.edu/~gerhard/papers/2012/paper-AVI-context-aware.pdf, 8 pages.
Android Developers, "Navigation Drawer", http://developer.android.com/design/patterns/navigation-drawer.html, 12 pages.

* cited by examiner

GRAPHICAL USER INTERFACE FOR TRACKING CONTEXT

BACKGROUND

Virtual machines (VMs) are an increasingly popular technology for improving flexibility and efficiency in a range of computational systems. Certain VM systems are conventionally managed using a graphical user interface (GUI) application, which provides an intuitive visual interface for managing individual virtual machine instances. As VM systems grow to include a larger number of VM instances, conventional GUIs can quickly become unwieldy and inefficient in presenting information about individual VM instances.

Further, recent improvements in the computing power, mobile display technologies and connection speeds of mobile devices, combined with the continued decreases in hardware costs, have made powerful mobile devices available even to system administrators and the general public. Mobile applications for the mobile devices have been developed to provide access to information services and applications when users are traveling or away from the office, including GUIs for managing VM instances in a datacenter. However, problems with presenting information about the datacenter in conventional GUIs are further exacerbated by limitations in display size and usability of mobiles devices.

SUMMARY

One or more embodiments of the present disclosure provide a method, system, and computer-readable storage medium having executable instructions for displaying a user interface of an application for managing information. The method includes displaying a graphical user interface (GUI) having a first view for a first object, and generating a context associated with the first object and comprising one or more content objects within the context. The method further includes receiving an indication, from a user, to navigate to a second view of the GUI for a first content object. The method includes generating, by operation of one or more processing units, the second view comprising a header having information about the context associated with the first object. The method further includes displaying the second view on a display device.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings.

DETAILED DESCRIPTION

One or more embodiments disclosed herein provide methods, systems, and computer programs for presenting information via a graphical user interface that enables a user to track context while the user investigates solutions to a problem. By way of example, a system administrator may access an application configured according to techniques described herein to respond to an alert raised by a datacenter. In this example, the application may be a mobile application used by the system administrator when away from the datacenter. Upon receiving an alert on their mobile device, the system administrator can manage virtual machines in the datacenter using the mobile application and view the virtual machine that may need attention. The system administrator may navigate within the mobile application to drill down to view the virtual machine and to further view the alert raised.

According to one embodiment, the mobile application generates a current context based on the alert. The application presents possible solutions and documentation to the user. While in the context, a visual representation of the context is shown to the user as the user searches for knowledge base articles, views log files of the virtual machine, researches on the web, and perform other actions. If a relevant article or content is found, the user may mark the content or a portion of the content (e.g., quoting text). Marking the content attaches the content to the current context. A visual indication indicates to the user that the action within the current context has been taken. Further, the user may execute management operations (e.g., power cycle operation) or delegate the alert to another system administrator of the datacenter. Delegation of the alert may include sharing the contexts (i.e., and the associated marked content) with other users to facilitate knowledge sharing and troubleshooting of the problem at hand.

According to one embodiment, the mobile application may create a context based on traversal of a graph of information. The mobile application presents the context to a user with affordance of actions taken within the context. The user may act on information from the context, e.g., to resolve problems within a datacenter. Further, the user may share the context such that others may benefit from information gathered. Accordingly, embodiments of the present disclosure provide techniques for information about virtual machines and other components of a datacenter in a simple and intuitive manner while providing sufficient contextual information so that virtual machines can be managed effectively.

Figure 1:
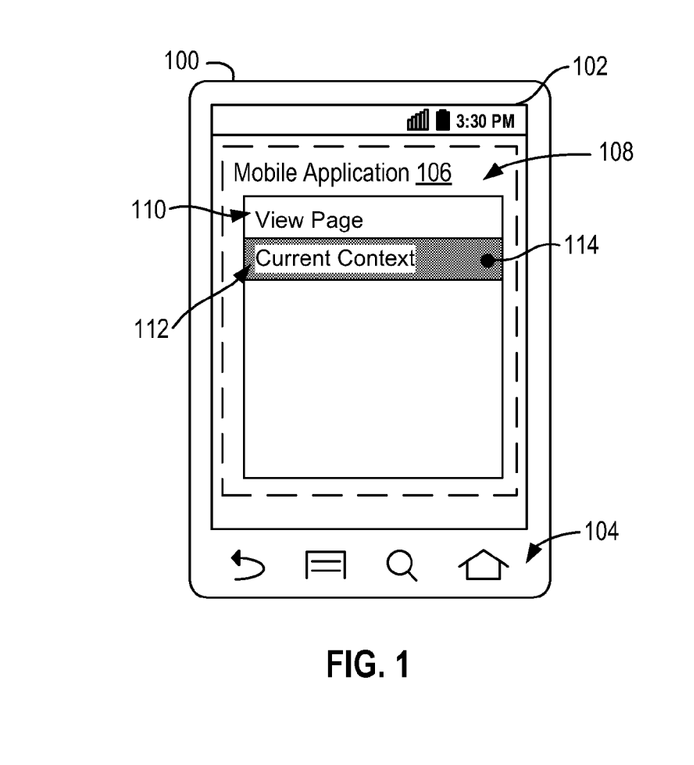
FIG. 1 is a schematic illustration of a mobile device, according to one or more embodiments of the disclosure.

FIG. 1 is a schematic illustration of a mobile device 100 according to one or more embodiments of the disclosure. Mobile device 100 may be smartphone, a tablet computing device, and in general any computing device that is portable and configured for wireless connectivity with a network. In the embodiment shown, mobile device 100 includes a display device 102, such as a touch screen, and a plurality of keys 104, and is configured to execute one or more mobile applications 106. While embodiments of the present disclosure describe a mobile application executing on a mobile device, it should be recognized embodiments of the present disclosure are not limited to mobile applications and mobile devices. It should be appreciated that techniques for tracking context as described herein may be applied to any computer application having a graphical user interface and executing on a computing device.

Mobile application 106 includes a graphical user interface (GUI) 108 for displaying information to a user and for receiving user input. In one embodiment, GUI 108 may be organized into one or more views 110 that provide the user access to information in different formats and in different levels of detail. GUI 108 enables a user to navigate from one view to a next view, for example, in response to user input of tapping a button or navigational GUI element. In certain computer applications, each view 110 may occupy most or substantially all of the displayed area provided by GUI 108, particularly in mobile applications 106 running on a mobile device 100 which might have a limited display space compared to desktop computers. As such, previous approaches to providing graphical user interfaces in applications had challenges in displaying, navigating, and organizing information in an easy-to-understand for users.

Accordingly, embodiments of the present disclosure provide a GUI 108 of a mobile application 106 configured to maintain a context that tracks information gathered and actions taken by a user during interaction with mobile application 106. In the embodiment shown in FIG. 1, GUI 108 may display a visual representation of the context, depicted as context header 112, that provides affordances to the user about the current context relative to the displayed view 110 (e.g., View Page) and information within that context. Context header 112 identifies the context, e.g., through title text, and includes provides one or more GUI elements 114, such as, badges, icons, and buttons, which represent information within that context, and is described in greater detail later.

Figure 2:
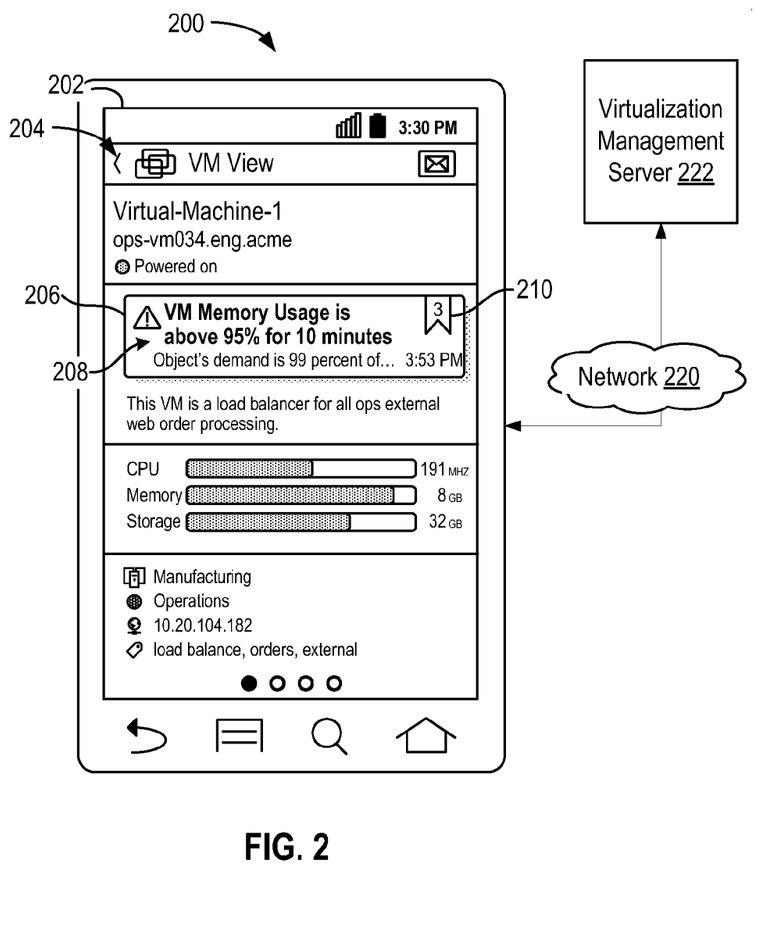
FIG. 2 illustrates a user interface for a mobile application maintaining a current context, according to one embodiment of the present disclosure.

FIG. 2 illustrates a user interface 202 for an exemplary mobile application 200 maintaining a current context, according to one embodiment of the present disclosure. In the example shown, mobile application 200 is an application for managing virtual machines (VM) executing in a datacenter; however the techniques described may be applied to other types of applications. Mobile application 200 in this example may communicate with a virtualization management server 222 via a network 220 (e.g., the Internet) to retrieve information about the operations and status of VMs executing in the datacenter. One example implementation of virtualization management server 222 may be Virtual Center Server (also referred to as "vCenter") software made available by VMware, Inc. of Palo Alto, Calif.

In the example shown in FIG. 2, user interface 202 includes a view 204 (e.g., "VM View") that provides detailed information about a particular VM (e.g., Virtual-Machine-1). As depicted, view 204 provides information about the status of the VM (e.g., "Powered On"), text description of the VM (e.g., "This VM is a load balancer for all ops external web order processing"), resources metrics pertaining to CPU, memory, and storage (e.g., "191 MHz," "8 GB," "32 GB"), network information (e.g., IP address 10.20.104.182), and other metadata.

In operation, mobile application 200 may receive one or more alerts 206 from virtualization management server 222 in response to changes in condition, changes in status, and triggering of alert conditions for VMs and other computing components (e.g., storage, network, and hosts). For example, mobile application 200 may receive an alert indicating that memory usage of a particular VM is above a threshold value for a threshold duration of time. A user of the mobile application (e.g., a system administrator) may receive the alert and use mobile application 200 to review the VMs in the data center and access information about the one or more VMs that need attention. In some embodiments, an alert may have an alert type that indicates a canonical version of the alert, for example, represented by an alert code, error number, or exception type. As such, an alert as used herein may refer to a particular instance of a canonical version of the alert. In some embodiments, a current instance of an alert may be linked to previous instances of the alert, for example, by the canonical version represented by an alert code.

In one embodiment, user interface 202 includes a graphical representation of alert 206 associated with the virtual machine displayed in view 204. In some embodiments, alert 206 includes title information that identifies the alert (e.g., "VM Memory Usage is above 95% for 10 minutes"), detailed information for the alert (e.g., "Object's demand is 99 percent of . . . "), date and time of the alert, and other metadata associated with the alert. In one embodiment, the graphical representation of alert 206 includes a count 210 indicating a number of items that were marked during the current instance or a previous instance of this alert.

A user may navigate between views of the GUI to access different objects (e.g., VMs, alerts, KB articles). According to one embodiment, application 200 may have a node-graph architecture that specifies how a user may navigate from one object to a next object according to a graph of nodes. In some embodiments, a GUI for application 200 may include a plurality of views 110 organized according to a graph that specifies how a user may navigate from one object to a next object or from one view to a next view.

Figure 3:
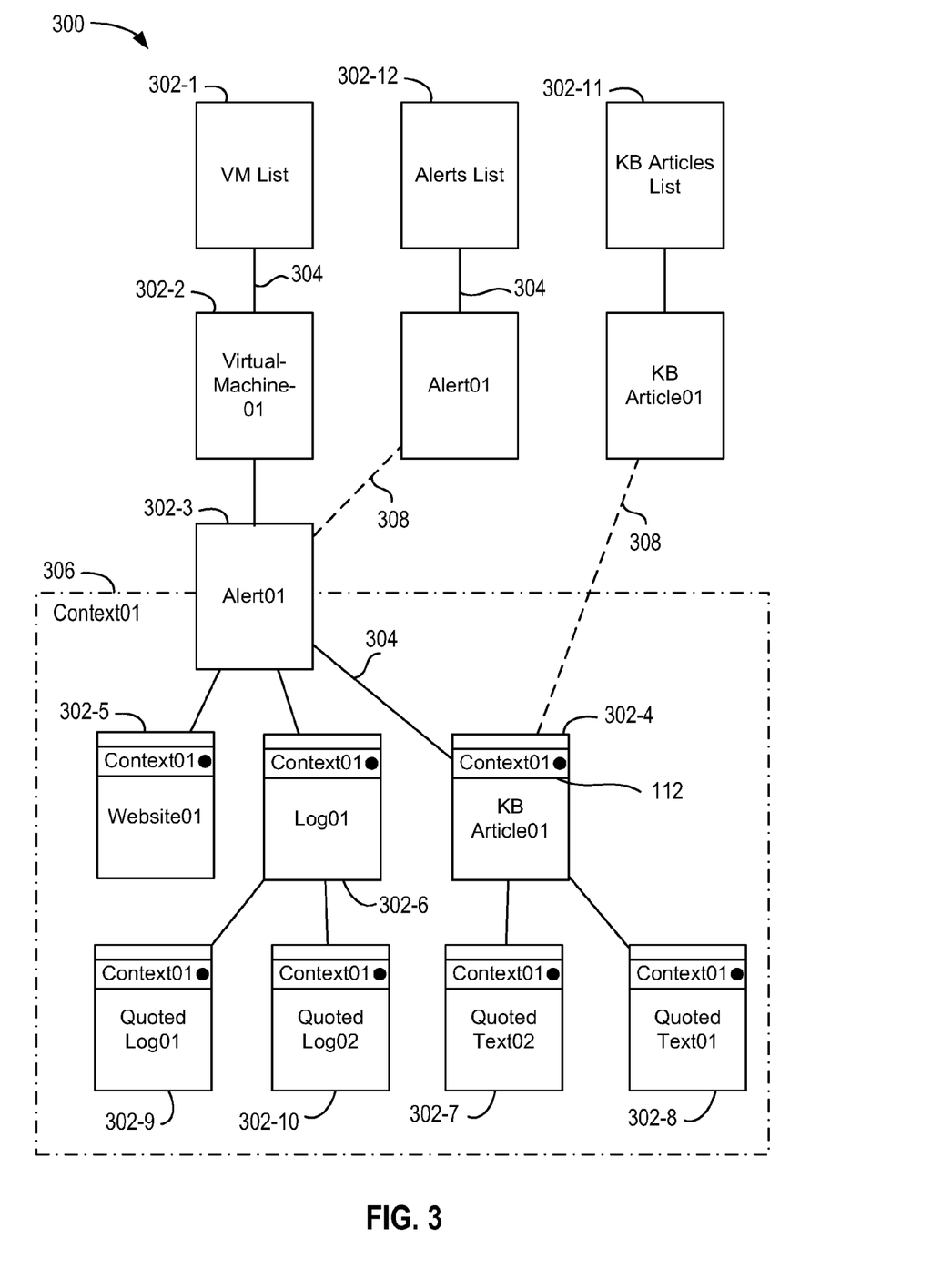
FIG. 3 is a block diagram depicting an exemplary graph-based hierarchy for a mobile application, according to one embodiment of the present disclosure.

FIG. 3 is a block diagram depicting an exemplary hierarchical graph 300 for mobile application 200, according to one embodiment of the present disclosure. Each node 302 (e.g., 302-1, 302-2, etc.) within hierarchical graph 300 represents one or more objects that may be viewed by mobile application 200. An example of node 302 includes a node 302-3 representing a VM (identified as Virtual-Machine-1) displayed to the user via view 204, as described earlier in conjunction with FIG. 2. In the embodiment shown, node 302-3 represents a VM having an alert context. Each link 304 between nodes represents a two-way navigation within the user interface of the application between objects. In the embodiment shown, the link between node 302-1 (identified as a VM List) and node 302-2 (identified as Virtual-Machine-1) specifies a user may navigate between a list of a plurality of VMs to information for a particular VM. For example, a user interacting with a GUI configured according to hierarchical graph 300 may be presented with a first display showing a list of VMs, select one of the VMs on the list, and then be presented with a second display showing details about the selected VM. As such, the user may navigate through data content of the application as conceptualized by traversing nodes of the graph shown in FIG. 3.

According to one embodiment, each node 302 in hierarchical graph 300 may be a basis for a current context 306. Context 306 tracks information gathered and actions taken by a user in relation to the node which is the basis for context 306. In one embodiment, information or performed actions that are "within" a context include any nodes 302 contained within context 306 as depicted in FIG. 3. In embodiments having a hierarchical graph 300, objects within a context may be determined according to parent/child element or super/sub element relationship or other relationships, depicted as links 304.

Context 306 may be embodied within a GUI as a context header 112 that aggregates information related to context 306, and that further provides navigational clues to a user when exploring information potentially related to context 306. Context header 112 may be a visual banner that is shown to the user on all nodes and corresponding views and pages contained within context 306. Information gathered and actions taken may be represented in context header 112 as an icon or badge indicating a number of actions taken or type of actions taken. Context header 112 may be used to access context 306 and display associated content objects. While FIG. 3 illustrates a single context 306, it should be recognized that application 200 may generate and maintain more than one context in association with one or more objects of application 200. Further, contexts 306 may be nested to provide additional information to one or more sub-contexts.

In the example shown in FIG. 3, application 200 may generate a context based on an alert for a VM. As shown, context 306 is generated for an alert for a VM represented by node 302-3 and identified as Alert01. The generated context may track content objects explored by a user (e.g., system administrator) to investigate, understand, and resolve the issue raised by the alert. For example, the user may navigate to a knowledge base article (represented by node 302-4), a website (represented by node 302-5), to a log file (represented by node 302-6), or other forms of documentation, which potentially contains information related to the alert. Application 200 provides access to the content object (e.g., knowledge base article 302-4) and further provides a context header 112 that indicates current context 306 to the user.

In one embodiment, a user may expressly associate, e.g., via user input, one or more content objects with context 306. Application 200 may automatically associate content objects with a context 306 based on user interactions, for example, by tracking content objects navigated to by the user and automatically associating the content objects with the current context. In some embodiments, a user may clip, highlight, annotate, quote, and modify a content objects in association with a current context 306. As such, application 200 may associate sub-objects derived from content objects with a current context 306. In the example shown, a user may quote text (represented by nodes 302-7 and 302-8) of a marked knowledge base article (e.g., KB Article01) the user deems particularly relevant to the alert of the current context. In another example, a user may quote portions (represented by nodes 302-9 and 302-10) of a log file (e.g., Log01) from the VM having the alert. While FIG. 3 depicts quoted KB articles and log files, it should be recognized that a user may clip, highlight, annotate, quote, and modify portions of other suitable content objects as described above, such as web pages (e.g., node 320-5).

Figure 8:
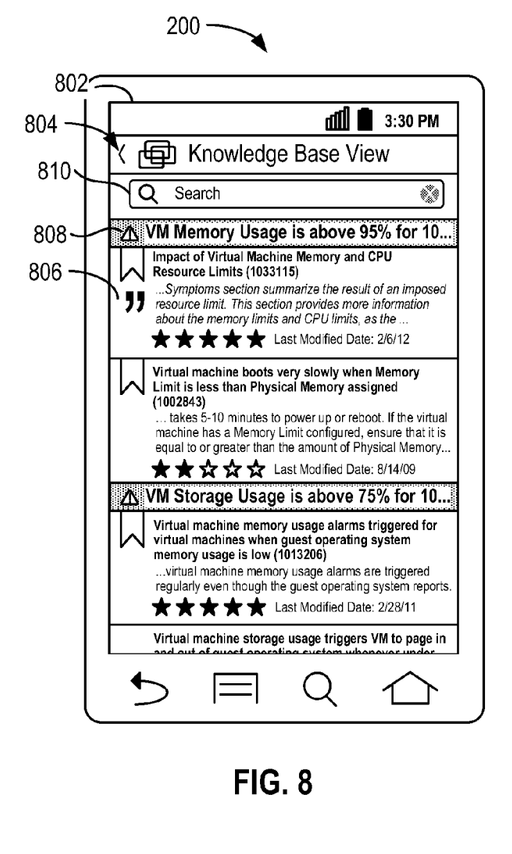
FIG. 8 illustrates a user interface of a mobile application for viewing content objects that enables jumping in and out of a context of an alert, according to one embodiment of the present disclosure.

In one embodiment, a user may navigate the GUI of application 200 to jump in and out of context 306, as represented by links 308. For example, if the user uses a generic search or listing of knowledge base articles (represented by node 302-11 and identified as "KB Articles List") to independently navigate to a knowledge base article (e.g., 302-4) that is the same as an article within context 306, the user may jump into context 306 and view the alert (e.g., 302-3) and the VM (e.g., 302-2) associated with the knowledge base article (e.g., 302-4). An example view corresponding to node 302-11 is shown in FIG. 8 and described later. Similarly, the user may view a listing of alerts (represented by node 302-12 and identified as "Alerts List"), navigate to an alert (e.g., 302-3) of context 306, and jump into context 306.

Figure 4:
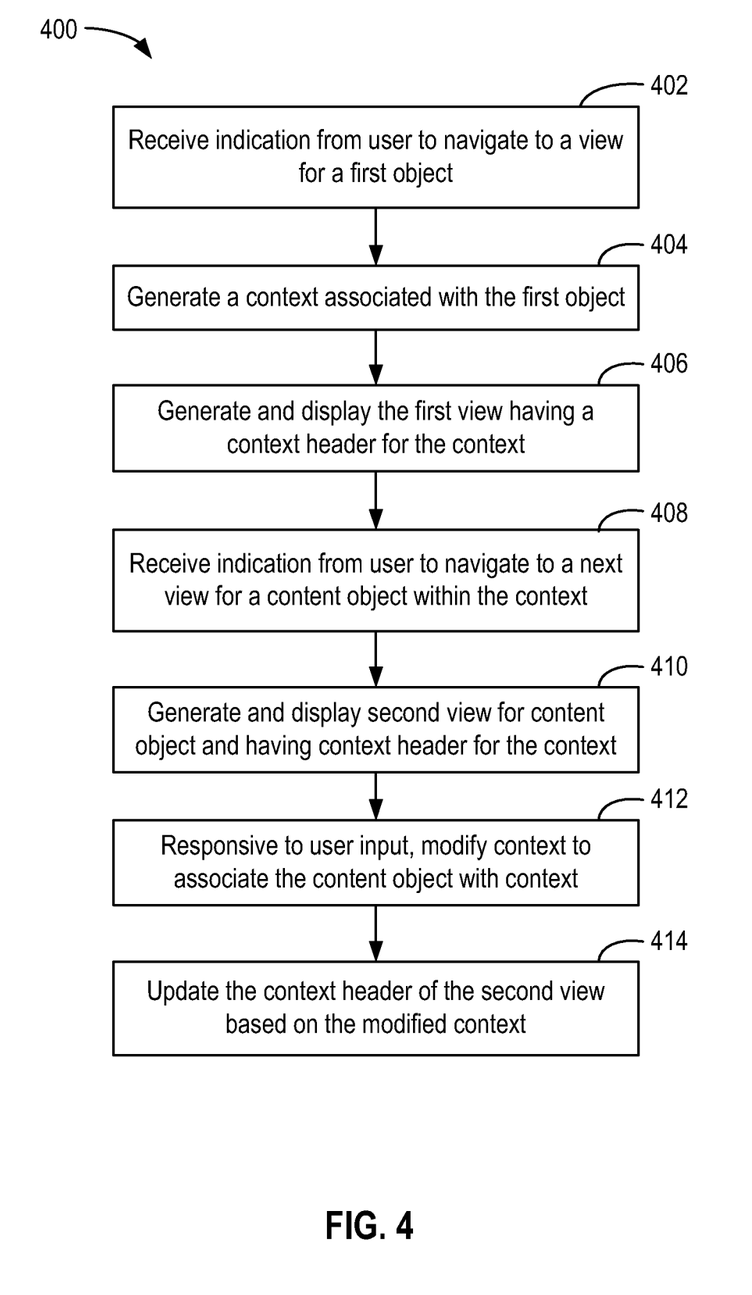
FIG. 4 is a flow diagram for a method for displaying a user interface for managing information of an application, according to one embodiment of the present disclosure.

FIG. 4 is a flow diagram for a method 400 for displaying a user interface for managing information of an application, according to one embodiment of the present disclosure. While method 400 is described in conjunction with the system depicted in FIGS. 1 and 2, it should be recognized that other systems may be configured to perform the method described herein.

At step 402, application 200 receives an indication, e.g., user input, from the user to navigate to a view for an object. In one embodiment, application 200 may receive user input to navigate from a VM's view 204 displaying information about a VM (e.g., Virtual-Machine-1) to a next view associated with an alert 206 that renders information and data about the alert to user. For example, the user may navigate to an alert view for alert 206 by tapping on the graphical representation of alert 206 within view 204 shown in FIG. 2.

At step 404, application 200 generates a context associated with the object. In some embodiments, application 200 generates a context based on the type of the object (e.g., an alert). For example, any object that is an alert for a VM and viewed by the user within the application may become the current context. In other embodiments, application 200 may generate a context according to a set of rules that dynamically determine a context based on the user's navigation within hierarchical graph 300 or based on a relationship to user's other actions or state. Application 200 may assign a context for an object based on a depth of the corresponding node in the hierarchical graph, e.g., a context for any object at the third level of hierarchical graph 300.

In one embodiment, each context for an alert is based on an alert definition, which is a canonical version of the alert. Each instance of the alert may be related to other instances of the same alert definition. Different alert histories, as embodied by alert contexts and associated objects, can be shared to other alerts of that same canonical alert type. In one embodiment, alert contexts can be related by actions taken or information gathered within each context. For example, if a same knowledge base article is saved within two different contexts, then the two contexts are associated with each other through the knowledge base article.

At step 406, application 200 generates and displays the view for the first object (e.g., alert). Application 200 may retrieve data for the object (e.g., alert) from a server in communication with mobile device 100, such as virtualization management server 222, although other sources may be used, such as the Internet or from a local storage device of mobile device 100. In one embodiment, the view for the object (e.g., alert) includes a context header 112 that provides information of the context to the user. One example alert view is illustrated in FIGS. 5A and 5B.

Figure 5A:
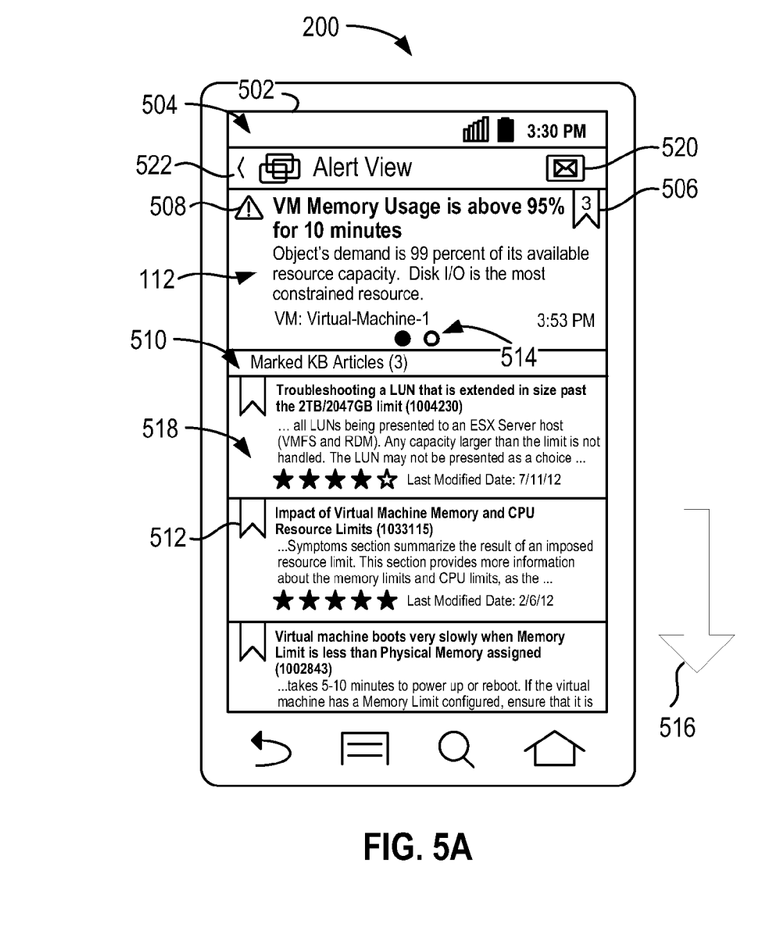
FIGS. 5A and 5B illustrates a user interface of a mobile application for viewing an alert, according to one embodiment of the present disclosure.
Figure 5B:
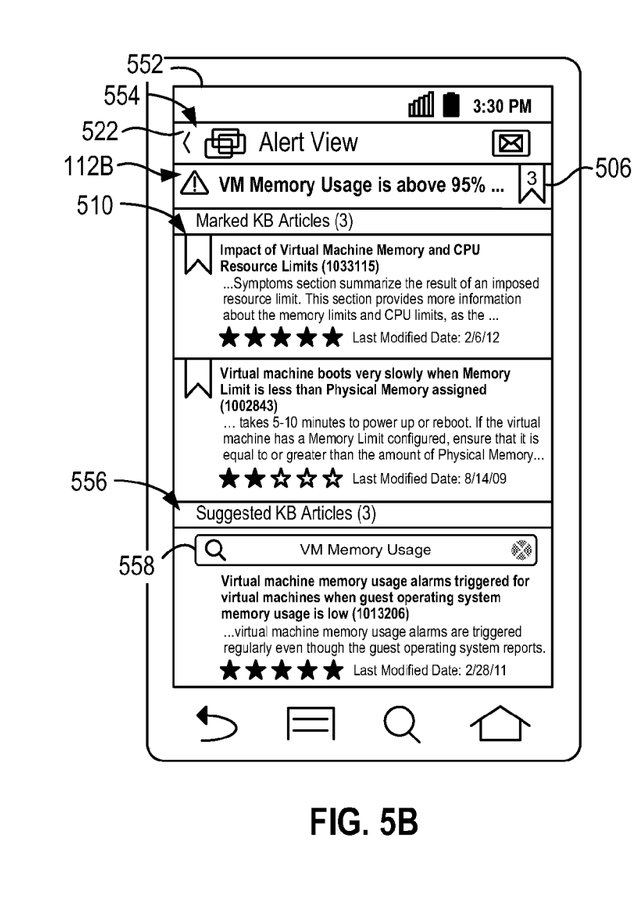

FIG. 5A illustrates a user interface 502 of mobile application 200 for viewing an alert, according to one embodiment of the present disclosure. User interface 502 includes a view 504 (e.g., "Alert View") that provides information about an alert. In one embodiment, view 504 includes a context header 112 having information of the associated object (e.g., alert). In one particular embodiment, context header 112 may be a row of information disposed proximate to the top of view 504, and below a title bar 522 (e.g., "Alert View") of view 504, although other sizes, shapes, positions, and configurations may be used.

As shown, context header 112 may include a title of the alert (e.g., "VM Memory Usage is above 95% for 10 Minutes"), detailed description of the alert, identification of the VM involved (e.g., "VM: Virtual-Machine-1"), a severity of the alert (as depicted by icon 508), date and time of the alert, and other metadata related to the alert. Context header 112 may include an aggregate count 506 of content objects marked or associated with the context. In the example shown, aggregate count 506 of "3" indicates three content objects, such as knowledge base articles, websites, log files, etc., have been marked or associated with this instance of the alert.

View 504 further includes a list 510 of content objects marked or associated with an instance of the alert, for example, a listing of knowledge base articles marked for the alert. As mentioned earlier, content objects associated with one particular instance of an alert context may be stored and retrieved later when another instance of the same alert type arises, as a form of alert history. As such, list 510 may include content objects that have been marked or associated with previous instances of the alert. In the embodiment shown, listing 510 includes a plurality of knowledge base articles having titles and excerpted contents, and, in some embodiments, an icon 512 indicating the knowledge base article has been marked for the context. While the embodiment shown depicts a plurality of knowledge base articles, it should be recognized that other types of content objects may be listed as associated with the context. For example, view 504 may include indications of pagination (depicted as dots 514) that enable the user to access other types of content objects, such as log files, when swiped, scrolled, or activated.

In one embodiment, view 504 includes one or more UI elements, depicted in FIG. 5A as a message button 520, configured to share context 306 with other users. Sharing contexts is described in greater detail in conjunction with FIG. 7.

According to one embodiment, representation of the context (i.e., context header 112) may change according to user interactions and different views. FIG. 5B illustrates user interface 552 of mobile application 200 having a view 554 with a changed context header 112B, according to one embodiment of the present disclosure. FIG. 5B depicts view 554 as similar to view 504, after the user has scrolled down listing 510 of knowledge base articles of view 504, as depicted by arrow 516. Responsive to such a user interaction, application 200 changes display of context header 112, which is a large row in view 504, to a more compact context header 112B as a smaller strip in view 554. Compact context header 112B may have a reduced level of detail but retains important information for identifying the context to the user. In the embodiment shown, compact context header 112B retains the title of the alert (albeit truncated), the severity of the alert, and aggregate count 506 of associated content objects, and removes displays of other details. In some embodiments, compact context header 112B may switch between the current compact view and an expanded view that displays all details in response to user interaction (e.g., the user taps on the compact context header 112B to get more details). Further, context header 112B may be pinned to the top of view 554 to maintain context header 112B at top, even as content below may scroll off-screen. For example, view 554 has been scrolled vertically to the point where one knowledge base article 518 (shown in FIG. 5A) has been scrolled off-screen and no longer visible, and context header 112B is retained at top.

In one embodiment, view 554 includes access to unmarked content objects that may potentially be related to context 306, for example, a region 556 for suggested knowledge base articles. In the embodiment shown, view 554 may further include a search field 558 to allow the user to search for new content objects (e.g., knowledge base articles) to mark as associated with context 306. Application 200 may pre-populate region 556 or search field 558 with suggested articles based on the canonical alert associated with the current context.

Referring back to FIG. 4, at step 408, application 200 receives an indication, e.g., user input, from the user to navigate to a next view for a content object within context 306. Using the example of FIG. 3, application 200 may receive user input to navigate from a view 504 displaying information about an alert to a next view that displays a knowledge base article (e.g., node 302-4) to the user. For example, the user may navigate to a knowledge base view by tapping on one of the knowledge base articles in listing 510 or region 556 shown in FIGS. 5A and 5B.

At step 410, application 200 generates and displays the second view for a content object (e.g., knowledge base article) within context 306. Application 200 may retrieve data for the content object from a local storage device on mobile device 100, from a server in communication with mobile device 100, such as virtualization management server 222, and/or from a variety of other sources, including the Internet.

In one embodiment, the second view for a content object includes a context header similar to context header 112 that provides information of the context to the user. As such, even though the second view may dedicate most or substantially all of the user interface to displaying a knowledge base article for the view to reader, embodiments of the disclosure provide a context header that indicates to a user the relationship the currently viewed object and other objects in previous views. One example view for a content object is illustrated in FIGS. 6A and 6B.

Figure 6A:
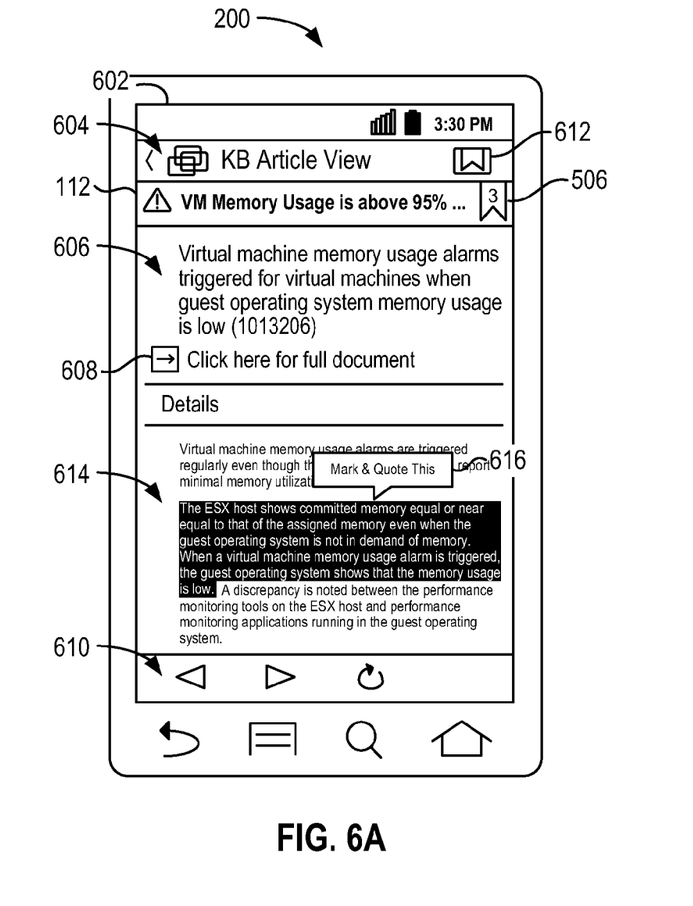
FIG. 6A illustrates a user interface of a mobile application for viewing a content object, according to one embodiment of the present disclosure.
Figure 6B:
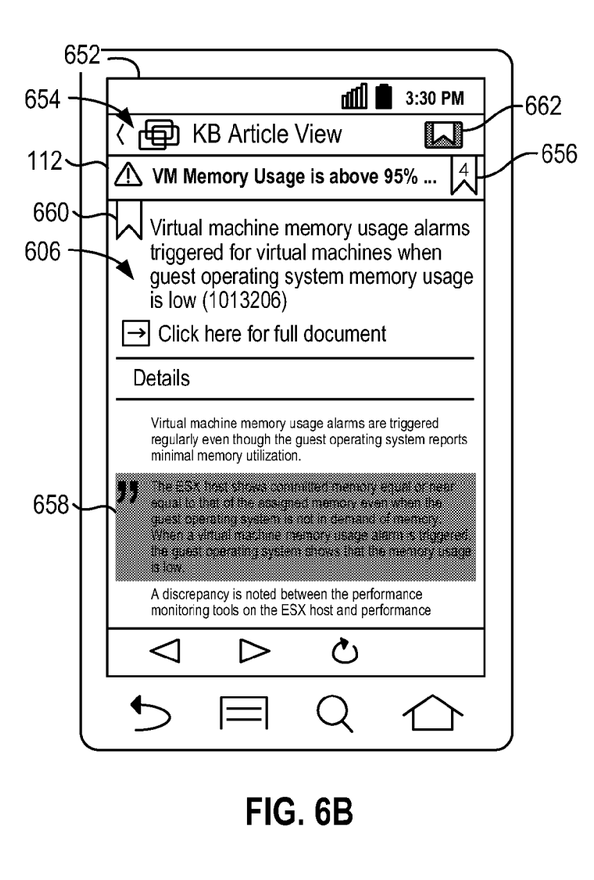
FIG. 6B illustrates a user interface of a mobile application having a view updated based on a modified context, according to one embodiment of the present disclosure.

FIG. 6A illustrates a user interface 602 of mobile application 200 for viewing a content object, according to one embodiment of the present disclosure. User interface 502 includes a view 604 (e.g., "KB Article View") that displays the content object, e.g., knowledge base article. View 604 displays contents 606 of the knowledge base article, including title, text, graphics, hyperlinks, attachments, and other data. In some embodiments, view 604 may display a preview or summary of the knowledge base article and provide a link or navigation link 608 to view a full version of the document, e.g., within mobile application 200 or other application for viewing documents that is executing in mobile device 100. It should be recognized that contents 606 may include hyperlinks (e.g., URLs) or attachments to other knowledge base articles and other content objects. In one embodiment, view 604 may include one or more control elements 610 that enable the user to browse and navigate the knowledge base article and other content objects. For example, in the embodiment shown in FIG. 6A, control elements 610 include "browser"-type controls such as a back button, forward button, and refresh button. While a knowledge base article is depicted in FIGS. 6A-6B, it should be recognized that other types of content objects may be displayed similarly in views as in view 604, such as a web site, log files, and other documents.

In one embodiment, view 604 includes a context header 112 that identifies context 306 and attributes of the context, e.g., information of the associated alert. Similar to context header 112 shown in FIGS. 5A-5B, context header 112 may include details about alert context 306, including a title of the alert (e.g., truncated to "VM Memory Usage is above 95% . . . "), a severity of the alert, and an aggregate count 506 of content objects marked or associated with the context, although other details may be included. As described earlier, context header 112 provides a graphical representation to the user of the relationship between the currently viewed content object (e.g., knowledge base article) in relation to alert 206. As such, even if the user navigates to and from other content objects within context 306, e.g., using control elements 610, context header 112 may remain within view 604.

Referring back to FIG. 4, at step 412, responsive to user input, application 200 modifies context 306 to associate the content object with context 306. In some embodiments, application 200 may mark the content object (e.g., knowledge base article) as being associated with context 306 for an alert. In the example user interface shown in FIG. 6A, when viewing a content object in the context of an alert, view 604 may include a bookmark button 612 configured to receive user input to mark the content object displayed with the context.

In some embodiments, application 200 may modify the context to include an annotation of the content object. Application 200 may receive user input to annotate the content object or quote a portion of the content object as part of marking the content object as being associated with context 306. In the example shown in FIG. 6A, application 200 may highlight, in response to user input, a portion 614 of content 606 and then mark the content object as being associated with the context 306. In some embodiments, when bookmark button 612 is activated by the user, application 200 generates a quoted content object (e.g., node 302-7) based on highlighted portion 614. In other embodiments, in response to highlighting a portion 614 of content 606, application 200 generate and display a localized callout 616 (e.g., "Mark & Quote This") configured to mark the quoted content object for context 306.

Referring back to FIG. 4, at step 414, application 200 updates the context header of the second view based on the modified context (e.g., in step 412). In some embodiments, application 200 modifies the view for the content object to update the aggregate count of content objects associated with the context, for example, by incrementing the count. In some embodiments, application 200 updates the view for the content object to indicate the updated state of the content object now in association with the context.

FIG. 6B illustrates user interface 652 of mobile application 200 having a view 654 updated based on a modified context, according to one embodiment of the present disclosure. View 654 for a content object is configured to display contents 606 of the content object marked as associated with context 306. FIG. 6B depicts view 654 that is similar to view 604, after the user has marked the knowledge base article displayed in view 654 as being associated with context 306. Responsive to such a user interaction, application 200 updates context header 112 to include an updated aggregate count 656 (i.e., incremented from "3" to "4") within context. In one embodiment, view 654 includes an indication of an association of the knowledge base article shown and context 306. In some embodiments, view 654 may include a badge or icon 660 in conjunction with displaying contents 606 of the contents object that indicates an association with a context. Further, in the example shown in view 654, bookmark button 612 may be toggled to mark and un-mark the knowledge base article within context 306. Bookmark button 612 may be toggled to become button 662, which is similar to bookmark button 612, except modified to reflect an activated state, e.g., de-pressed or filled in.

In one embodiment, view 654 may display one or more annotated portions of the content object in a highlighted portion 658 of view 654, for example, using an offset margin, highlighted background, or iconography, as shown in FIG. 6B. In one embodiment, view 654 may display an annotated portion of the content object in a different location than in the found location within content 606. In some embodiments, view 654 may display the annotated portion of the content object in an elevated or prominent location within view 654, such as at the top of view 654, or in a summary section of the knowledge base article.

According to one embodiment, application 200 may be configured to share one or more context(s) with other users such that other users may benefits from information gathered. Contexts generated for alerts may build up a history of knowledge over time and can be shared and distributed to other users that may encounter the same or similar issues raised by alerts. In one embodiment, contexts 306 may be stored on a server (e.g., virtualization management server 222), and accessed to contexts 306 may be made available to a plurality of users (e.g., system administrators). When a new alert appears, users may jump to a context of a previous instance of the alert to access the information and actions taken previously.

In some embodiments, a user may operate application 200 to gather information within a context of an alert and delegate handling of an alert to another user, for example, by e-mail. In one embodiment, the user may operate application 200 to share context of an alert having marked items from a previous instance of the alert with another user. In some embodiments, responsive to user input, application 200 may transmit a message to another user that includes the context and one or more content objects associated with the context. For example, a user may activate message button 520 within view 504 to share context 306 shown in view 504 with other users. An example user interface for sharing contexts is shown in FIG. 7.

Figure 7:
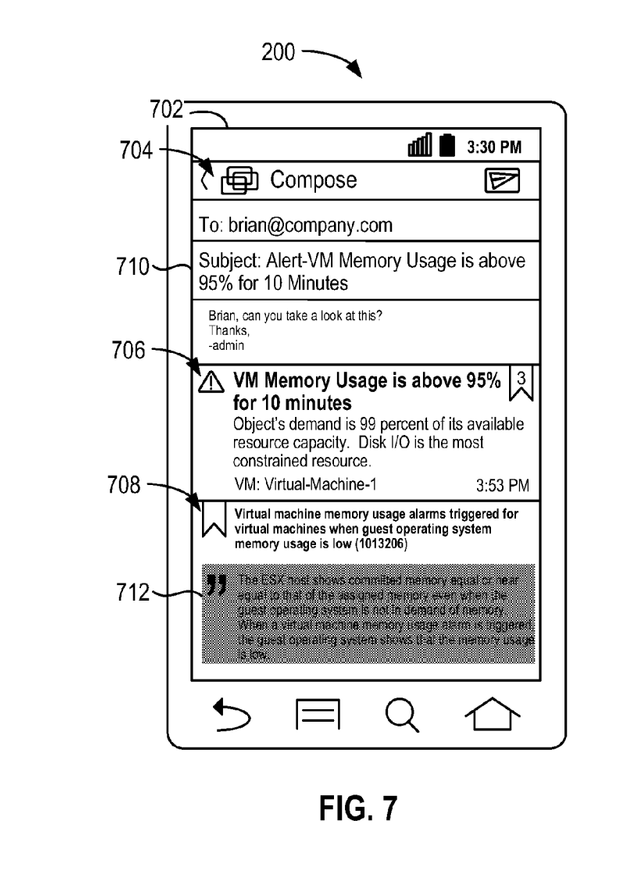
FIG. 7 illustrates a user interface of a mobile application for sharing a context of an alert, according to one embodiment of the present disclosure.

FIG. 7 illustrates a user interface 702 of mobile application 200 for sharing a context of an alert, according to one embodiment of the present disclosure. User interface 702 includes a view 704 (e.g., "Compose") for composing a message (e.g., e-mail) to share information about the alert. Application 200 may pre-populate a subject field of the message with a name of the alert being shared (e.g., "Alert-VM Memory Usage is above 95% for 10 Minutes"). In the embodiment shown, the drafting e-mail has an e-mail body that includes alert information 706 and a listing 708 of content objects marked in the context of the alert. Alert information 706 similar to the information provided by context header 112 in FIG. 5A, including a title of the alert, detailed description of the alert, identification of the VM involved, a severity of the alert, date and time of the alert, and other metadata related to the alert. In one embodiment, listing 708 of content objects may include title information for each content objects, an excerpt of contents of the content object, and one or more hyperlinks (e.g., URLs) to further access the content object. In some embodiments, listing 708 of content object may include annotated portions 712 or quoted portions of the content objects.

According to one embodiment, a user may navigate the GUI of application 200 to jump in and out of context 306 of an alert, as described earlier. FIG. 8 illustrates a user interface 800 of mobile application 200 for viewing content objects and that enables jumping in and out of the context, according to one embodiment of the present disclosure. It should be recognized that while FIG. 8 depicts a listing of knowledge base articles, views for other types of content objects as described herein, such as log files, web sites, or even other objects, such as alerts, may be configured similarly. For example, a user may view a listing of alerts (e.g., an "Alerts List"), and navigate to an alert of a context, and jump into the context.

User interface 800 includes a view 804 (e.g., "Knowledge Base View") configured to display a listing of knowledge base articles 806 and may optionally include a search field 810 to filter and find knowledge base articles according to search criteria. In one embodiment, view 804 (e.g., "Knowledge Base View") may be configured to display a listing of knowledge base articles 806 categorized by a corresponding context. In the embodiment shown, view 804 groups the plurality of knowledge base articles by their corresponding context 808, e.g., with group headers having the title of the corresponding alert (e.g., "VM Memory Usage is above 95% for 10 . . . "). A user may utilize view 804 to navigate to a particular knowledge base article 806 that is the same as an article within a context 306, and jump into context 306 and view the alert (e.g., "VM Memory Usage is above 95% for 10 minutes") and the VM associated with the knowledge base article. For example, in response to receiving a selection of a particular knowledge base article, application 200 may navigate to a view of the alert which is the basis for the context, such as view 504 depicted in FIG. 5.

The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for displaying a user interface of an application for managing virtual machines of a computing system, the method comprising:
   displaying a graphical user interface (GUI) having a first view for an alert, wherein the alert is based on a status of a virtual machine;
   displaying a plurality of content objects, wherein each content object is selected based on a subject matter of the alert;
   displaying, within the first view, a count that represents the number of content objects selected based on the subject matter of the alert;
   receiving an indication, from a user, to navigate to a second view of the GUI for a selected one of the plurality of content objects;
   displaying the second view, the second view comprising content of the selected content object; and
   displaying a button within the second view that, when selected, causes a bookmark to be applied to the content object selected for the second view.

2. The method of claim 1, wherein displaying the second view comprises displaying a header comprising the count representing the number of content objects selected based on the subject matter of the alert.

3. The method of claim 1, further comprising:
   modifying the second view to update an aggregate count of content objects associated with the subject matter of alert; and
   modifying the second view to indicate that the selected content object is associated with the subject matter of alert.

4. The method of claim 3, further comprising modifying the first view to
   include an annotation of the at least one content object.

5. The method of claim 1, wherein the first view comprises a list of content objects associated with the alert.

6. The method of claim 1, further comprising:
generating a third view comprising a list of a plurality of content objects categorized by a corresponding context.

7. The method of claim 1, further comprising:
responsive to user input, transmitting a message to a second user, wherein the message comprises the alert and the at least one content object associated with the alert.

8. A non-transitory computer-readable storage medium comprising instructions that, when executed in a computing device, for displaying a user interface of an application for managing information, by performing the steps of:
displaying a graphical user interface (GUI) having a first view for an alert;
displaying a plurality of content objects, wherein each content object is selected based on a subject matter of the alert;
displaying, within the first view, a count that represents the number of content objects selected based on the subject matter of the alert;
receiving an indication, from a user, to navigate to a second view of the GUI for a selected one of the plurality of content objects;
displaying the second view, the second view comprising content of the selected content object; and
displaying a button within the second view that, when selected, causes a bookmark to be applied to the content object selected for the second view.

9. The non-transitory, computer-readable storage medium of claim 8, wherein displaying the second view comprises displaying a header comprising the count representing the number of content objects selected based on the subject matter of the alert.

10. The non-transitory computer-readable storage medium of claim 8, further comprising instructions for:
modifying the second view to update an aggregate count of content objects associated with the subject matter of alert; and
modifying the second view to indicate that the selected content object is associated with the subject matter of alert.

11. The non-transitory computer-readable storage medium of claim 10, further comprising instructions for modifying the first view to
a include an annotation of the at least one content object.

12. The non-transitory computer-readable storage medium of claim 8, wherein the first view comprises a list of content objects associated with the alert.

13. The non-transitory computer-readable storage medium of claim 8, further comprising instructions for:
generating a third view comprising a list of a plurality of content objects categorized by a corresponding context.

14. The non-transitory computer-readable storage medium of claim 8, further comprising instructions for:
responsive to user input, transmitting a message to a second user, wherein the message comprises the alert and the at least one content object associated with the alert.

15. A mobile computer system for displaying a graphical user interface of an application for managing information, the computer system comprising:
a system memory;
a display device; and
a processor programmed to carry out the steps of:
displaying a graphical user interface (GUI) having a first view for an alert associated with a virtual machine;
displaying a plurality of content objects, wherein each content object is selected based on a subject matter of the alert;
displaying, within the first view, a count that represents the number of content objects selected based on the subject matter of the alert;
receiving an indication, from a user, to navigate to a second view of the GUI for a selected one of the plurality of content objects;
displaying the second view, the second view comprising content of the selected content object; and
displaying a button within the second view that, when selected, causes a bookmark to be applied to the content object selected for the second view.

16. The computer system of claim 15, wherein the processor is further programmed to carry out the steps of:
modifying the second view to update the aggregate count of content objects associated with the subject matter of alert; and
modifying the second view to indicate that the selected content object is associated with the subject matter of the alert.

17. The computer system of claim 15, wherein the processor programmed to carry out the step of modifying the context to include an association with the at least one content object is further programmed to carry out the step of:
modifying the first view to include an annotation of the at least one content object.

18. The computer system of claim 15, wherein the processor is further programmed to carry out the steps of:
responsive to user input, transmitting a message to a second user, wherein the message comprises the alert and the at least one content object associated with the alert.

* * * * *